United States Patent [19]

Bolliand

[11] Patent Number: 5,018,255
[45] Date of Patent: May 28, 1991

[54] METHOD AND APPARATUS FOR NEEDLING OF GLASS MAT AND COMPOSITE PRODUCT MADE FROM SAID MAT

[75] Inventor: Robert Bolliand, Ecully, France

[73] Assignees: Vetrotex Saint-Gobain S.A., Chambery; Institut Textile de France, Boulogne Billancourt, both of France

[21] Appl. No.: 211,195

[22] Filed: Jun. 24, 1988

[30] Foreign Application Priority Data

Jun. 26, 1987 [FR] France ............................ 87 09064

[51] Int. Cl.⁵ .................... D04H 11/08; D04H 18/00; D04H 5/02; D04H 1/46
[52] U.S. Cl. ...................................... 28/107; 28/113; 28/114; 28/115; 28/118; 65/44; 65/9
[58] Field of Search ................. 28/111, 113, 107, 108, 28/114, 115; 162/114; 65/4.4, 9, 11.1; 428/300; 223/102

[56] References Cited

U.S. PATENT DOCUMENTS

| | | | |
|---|---|---|---|
| 2,339,431 | 1/1944 | Slayter | 65/9 |
| 2,794,237 | 6/1957 | Dildilian et al. | 428/300 |
| 2,896,302 | 7/1959 | Costello | 28/113 |
| 3,506,503 | 4/1970 | Crosby | 28/111 |
| 4,277,531 | 7/1981 | Picone | 65/11.1 |
| 4,382,809 | 5/1983 | Porter et al. | 65/9 |
| 4,390,582 | 6/1983 | Pickens et al. | 28/113 |

FOREIGN PATENT DOCUMENTS

| | | | |
|---|---|---|---|
| 275175 | 1/1969 | Austria | 28/111 |
| 2254484 | 5/1974 | Fed. Rep. of Germany | 28/111 |
| 40-1805 | 2/1965 | Japan | 28/111 |
| 1080862 | 8/1967 | United Kingdom | 428/300 |

*Primary Examiner*—Werner H. Schroeder
*Assistant Examiner*—Bibhu Mohanty
*Attorney, Agent, or Firm*—Pennie & Edmonds

[57] ABSTRACT

This invention relates to needling of continuous glass yarn mats.

The invention consists in subjecting the mat to the action, preferably simultaneous action, of needles of different diameters. Thus perforations of different dimensions, preferably regularly distributed, are made in the mat.

This mat is intended to be used as reinforcement in composite materials with a base of thermoplastic resins, in particular in laminates.

4 Claims, 1 Drawing Sheet

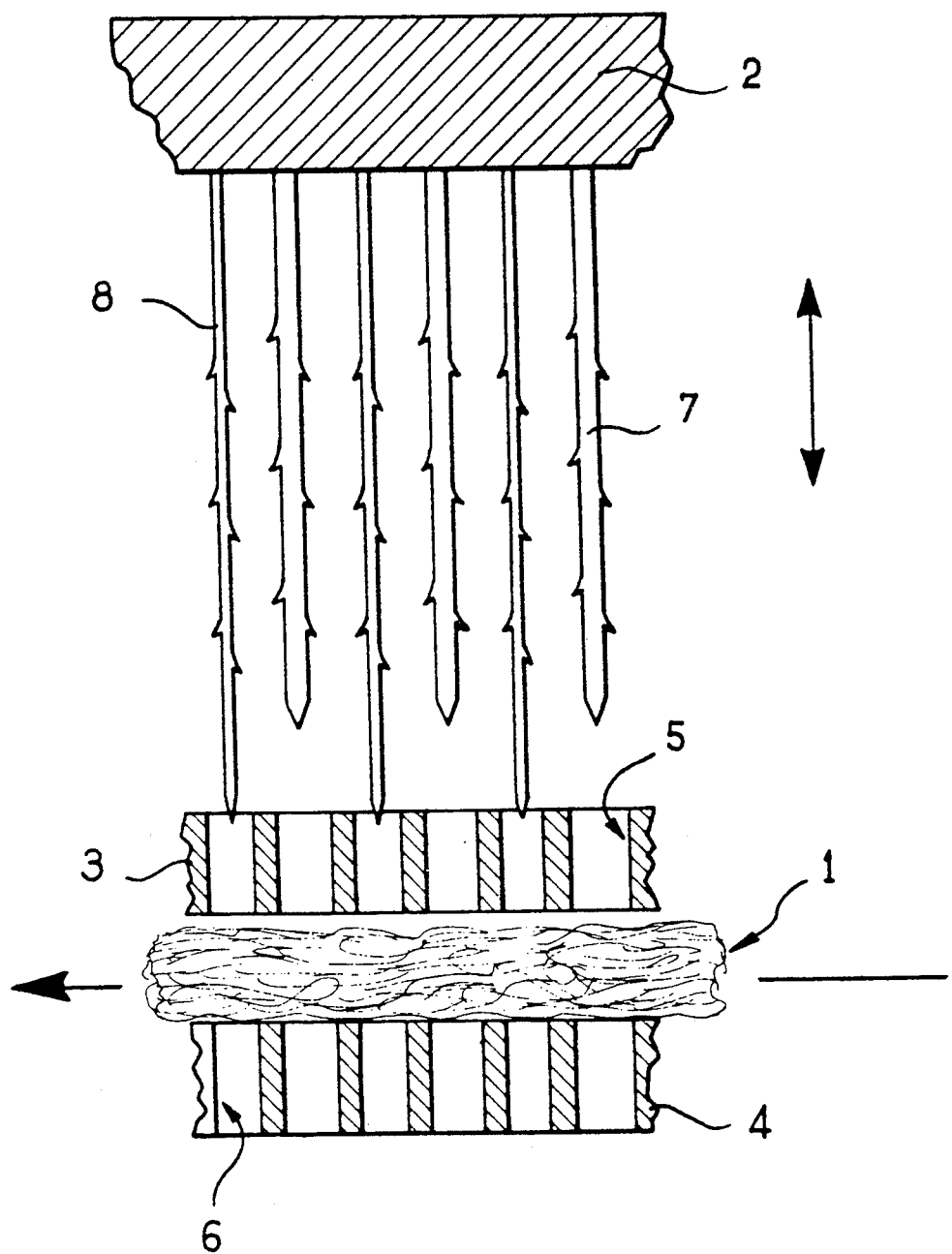

METHOD AND APPARATUS FOR NEEDLING OF GLASS MAT AND COMPOSITE PRODUCT MADE FROM SAID MAT

FIELD OF THE INVENTION

This invention relates to needling of continuous glass yarn mats, intended to be used as reinforcements in composite materials with a base of thermoplastic resins, and in particular in laminates.

Needling of continuous glass yarn mats has the aim of giving a good cohesion to the mat by tangling glass yarns and increasing the hooking characteristics of the thermoplastic resin to the mat by modification of the surface state of said mat. Barbed needles which go through the mat have a double action: they cut certain continuous constitutive yarns of the mat and they displace the yarns which comprise one or two free ends. The displacement of the yarns causes on the inside of the mat the tangling of the yarns which gives the mat its cohesion and on the surface of the mat the appearance of free ends of cut yarns or loops. It is found that each of the two main surfaces of the mat has, after needling according to the conventional process, a different appearance in regard to the density of the free ends of cut yarns projecting from said surface and the density of the loops: the main surface, corresponding to the face of the mat through which the needles penetrate, exhibits a slighter density of free ends which we will designate by the word tassels and a large amount of loops which we will designate by the term floats.

This difference of surface state between the two faces of the mat obtained by a conventional needling, in which all the needles have the same diameter and same length, causes a difference in hooking between the mat and the thermoplastic resin depending on whether the resin is applied to the one or the other face of the mat. This difference is all the more marked as the mat is formed of yarns comprising a greater number of filaments. Laminates made from a superposition of mats and thermoplastic resin (or thermoplastic sheets) can exhibit different mechanical characteristics depending on the appearance given to the mats.

DESCRIPTION OF RELATED ART

Thus, according to the teaching of the patent U.S. Pat. No. 4,335,176, a laminate made from two needled glass yarn mats sandwiched between three layers of thermoplastic resin exhibits improved mechanical characteristics when the mats are placed so that the faces comprising the most tassels are both turned toward the outside (FIG. 4 of patent U.S. Pat. No. 4,335,176) of the laminate.

This particular arrangement requires, during production of the laminate, a prior examination of the surface state of the mat and a presentation of the two mats according to the teaching of said patent. This can be a source of errors, which will not be immediately visible on the laminate itself, but whose effects will be produced on the stamped finished products. Further, this particular arrangement provides a satisfactory solution only for laminates made from two mats.

SUMMARY OF THE INVENTION

Now, there has been found, and this is particularly the object of the invention, a process for needling continuous glass yarn mats intended to be used as reinforcements of composite materials with a thermoplastic resin base, and in particular in laminates, which mitigates said drawback. The process of the invention is of the type known in which the mat is subjected to the repetitive action of needles provided with barbs. In an original way, it consists in subjecting the mat to the action, preferably simultaneous action, of two sets of needles of different diameters.

The diameter relates to that of the active part of the needle, i.e., that which penetrates into the mat. The active part of the needle can have any cross section, for example, circular or polygonal. By diameter should be understood that of the circle by which the cross section of the active part of the needle is circumscribed.

The invention relates to a needle board especially designed to use said needling process. This needle board is distinguished by the fact that it comprises two sets of needles, provided with barbs, some having a diameter between 0.50 and 2.35 mm and others having a diameter between 1.10 and 3.56 mm. Each set, for example, is mounted on the board at a rate of every other crosswise row.

Preferably, the needles with smaller diameters are longer than the needles with larger diameters. The glass yarn mat is then perforated first by the needles with the smaller diameter then by the needles with the larger diameter.

In a favored embodiment of the invention, the rows of large-diameter needles are 13 gage for needles having a shank with a diameter of 2.35 mm and a length of 76.2 mm and the rows of small-diameter needles are 15 gage for needles having a shank with a diameter of 1.83 mm and a length of 88.9 mm.

DESCRIPTION OF THE DRAWINGS

The Figure is a side view of the invention showing the alternating length needles striking the glass mat in the same portion of the mat.

DESCRIPTION OF THE PREFERRED EMBODIMENTS

The invention also relates to a sheet of thermoplastic resin reinforced with glass fibers in the form of at least two needled continuous yarn mats, each mat comprising perforations of different dimensions.

In a completely unexpected way, the continuous glass yarn mat needled according to the process of the invention is easily impregnated by a thermoplastic resin from its two faces.

An attempt is made to explain this aptitude for impregnation by making the following assumptions. The needles with larger diameter, when they penetrate the mat, create a momentary densification of the mat by shoving back the yarns they encounter. This densification enables the barbs of the needles with smaller diameters penetrating into these zones that are denser in the number of yarns to carry yarns previously cut by the needles with larger diameters and to create tassels. The presence both of cavities due to the perforation of the mat by the needles with larger diameters and of tassels drawn by the needles with smaller diameters improves the penetration and hooking of the thermoplastic resin to the mat.

The invention will be better understood from reading the description that will be given of a favored embodiment of a continuous glass yarn mat needled with a board with two sets of needles and from the accompanying drawing in which the single figure shows a partial view, in section, of a board with two sets of needles above a mat in the process of being needled. This description is given by way of nonlimiting example.

Continuous glass yarn mat 1 was formed from at least two continuous yarns distributed crosswise on a moving conveyor, in a known way and not described here. Each yarn comprises 50 filaments exhibiting a diameter of 17 microns. The grams per square meter of the mat obtained is 450 g/m².

The needling machine is a standard machine, not shown in the figure, which comprises a beam driven in an up and down movement thanks to a connecting rod and eccentric system; needle board 2 is fastened to this beam. The mat passes between two perforated plates, upper plate 3 or detacher and bottom plate 4 or anvil. The needles pass through holes 5 made in the detacher, penetrate into the mat and go through it until they descend into holes 6 made in the anvil.

On needle board 2 are mounted 50 rows of needles, alternately needles 7 and needles 8. Needles 7 have a shank with a diameter of 2.35 mm and a length of 76.2 mm. Needles 8 have a shank with a diameter of 1.83 mm and a length of 88.9 mm. The active part of these needles has a triangular cross section. Each needle comprises 9 barbs placed regularly over the entire height of the needle, at a rate of 3 barbs per edge.

The rows corresponding to needles 7 have a gage of 13, while the rows corresponding to needles 8 have a gage of 15.

Needling of mat 1 with needle board 2 is performed under the following operating conditions:

| | |
|---|---|
| speed of advance of mat | 1.20 m/min |
| striking speed | 150 strikes/min |
| penetration | 26 mm |
| number of needles per linear meter | 2500 |
| number of strikes per cm² | 10.6 |

The mats needled according to the invention can be used for reinforcing numerous thermoplastic resins such as vinyl or acrylic resins.

Thus, a laminate is made by using two mats needled as described above, between which is extruded a thermoplastic resin and which are between two thermoplastic sheets. The laminate is obtained by applying to the unit thus constituted a pressure when the temperature is high enough to assure progressive melting of the thermoplastic sheets. The device making it possible to produce such a laminate is described, for example, in U.S. Pat. No. 4,277,531 (FIG. 5).

Comparative tests were made with two laminates made under the same conditions from the same mats, with the same resin and same thermoplastic sheets, but in one of the laminates the two mats had their faces denser with tassels turned toward the outside according to the teaching of U.S. Pat. No. 4,335,176 and in the other, the two mats had a face denser in tassels turned toward a face less dense in tassels. The two laminates were stamped under the same conditions and no difference of behavior in the stamping or between the characteristics of the stamped finished products were noted.

The mat needled according to the invention, associated with thermoplastic resins, makes it possible to produce reinforced articles exhibiting excellent mechanical properties such as, for example, parts for automobiles made by die stamping.

Various modifications can be made to this invention without thereby going outside its scope.

I claim:

1. A process for needling a continuous glass filament mat comprising the step of subjecting a same portion of the mat to the simultaneous penetrating action of two sets of barbed needles with different diameters.

2. The process according to claim 1 wherein said portion of the mat is first perforated with smaller diameter needles and then with larger diameter needles.

3. The process according to claim 2 wherein said portion of the perforations are made in said mat such that the large and small perforations alternate and are regularly distributed.

4. A process for needling a continuous glass filament mat in which the mat is subjected to the simultaneous penetrating action of two sets of barbed needles with different diameters at the same portion of said mat wherein said mat is intended for use as reinforcement in composite materials with a resin base.

* * * * *